Figure 1:
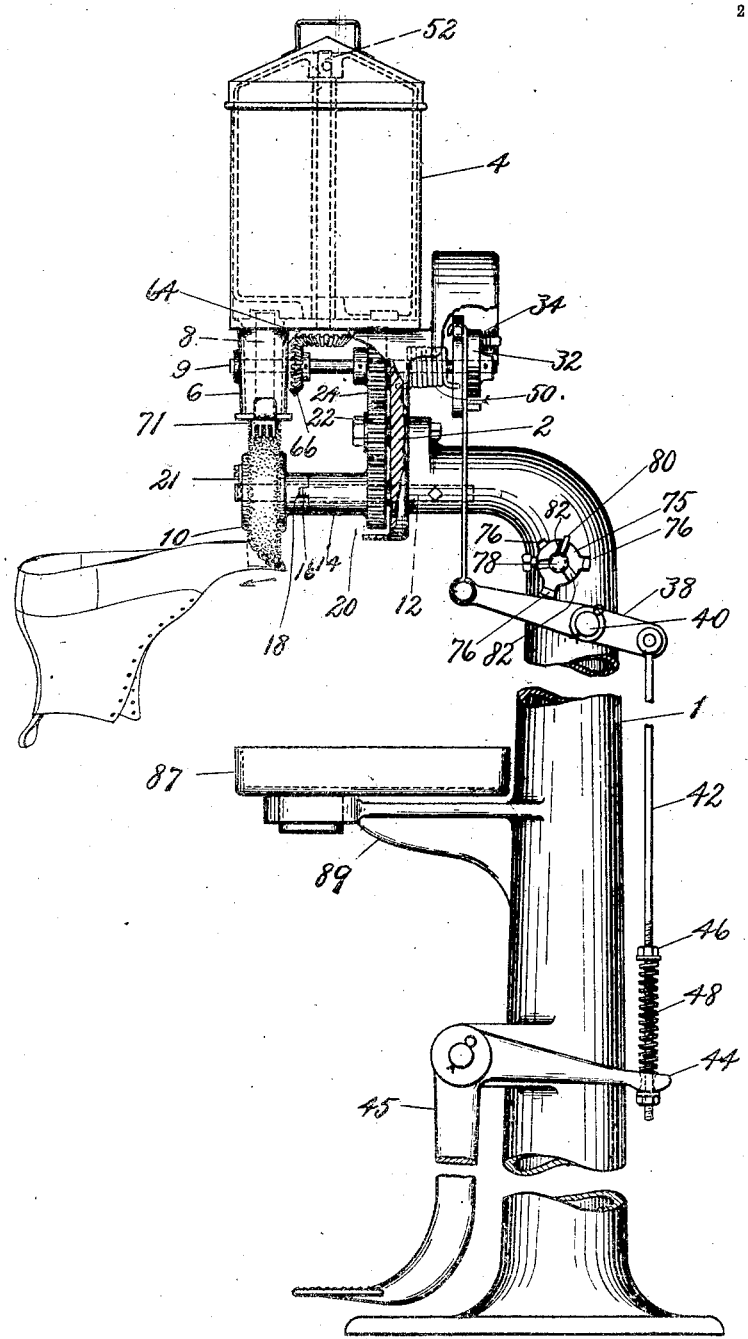

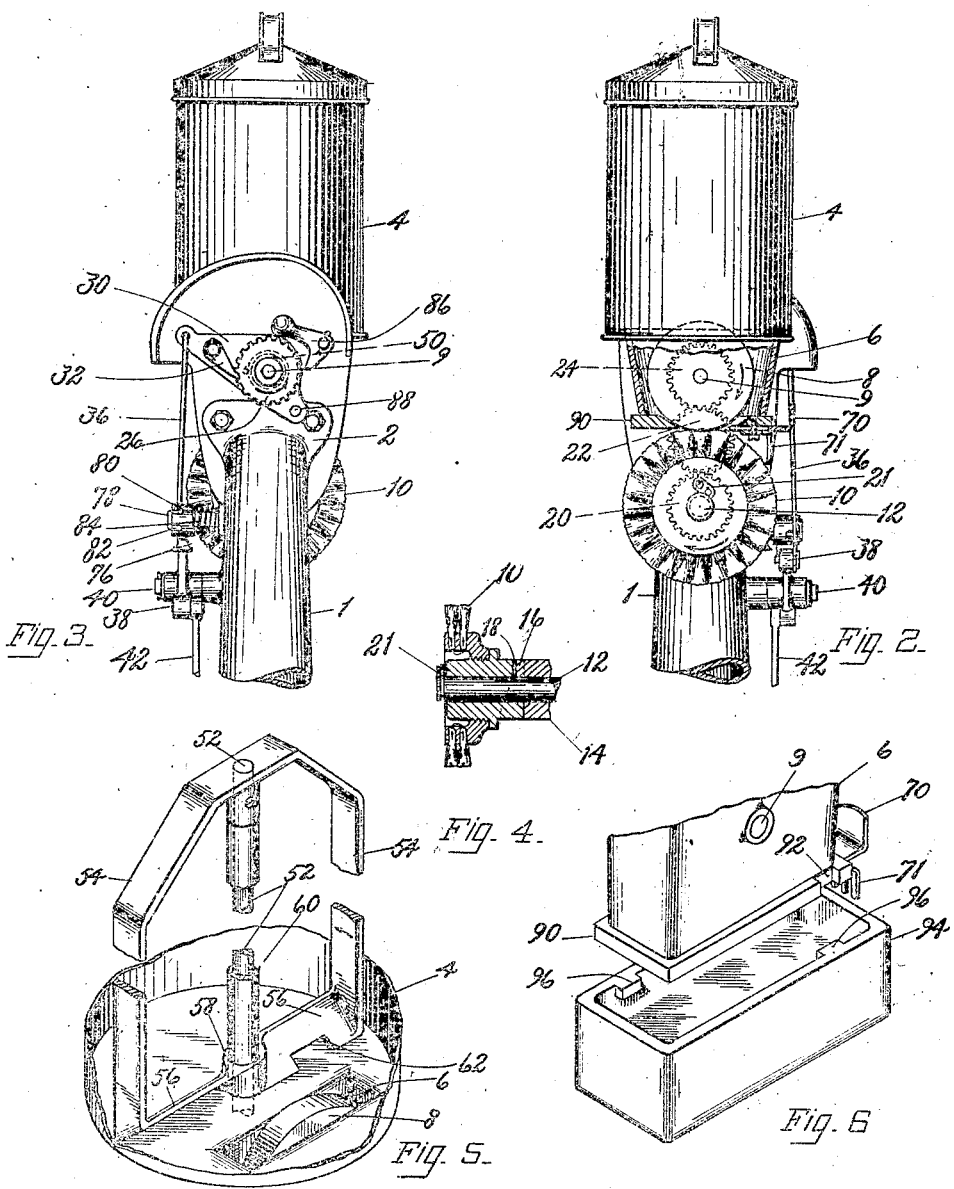

UNITED STATES PATENT OFFICE.

ORRELL ASHTON, OF LAWRENCE, MASSACHUSETTS, ASSIGNOR TO UNITED SHOE MACHINERY COMPANY, OF PATERSON, NEW JERSEY, A CORPORATION OF NEW JERSEY.

MACHINE FOR APPLYING PLASTIC OR ADHESIVE MATERIAL.

940,419.

Specification of Letters Patent. Patented Nov. 16, 1909.

Application filed February 8, 1905. Serial No. 244,764.

*To all whom it may concern.*

Be it known that I, ORRELL ASHTON, a citizen of the United States, residing at Lawrence, in the county of Essex and Commonwealth of Massachusetts, have invented certain Improvements in Machines for Applying Plastic or Adhesive Material, of which the following description, in connection with the accompanying drawings, is a specification, like reference characters on the drawings indicating like parts in the several figures.

This invention relates to machines for applying plastic or adhesive material to stock and particularly to machines designed to be employed in applying gum in connection with the forming of box toes of boots or shoes. It is a common practice in the manufacture of certain grades of shoes to form the "box toe" or stiffened toe of the shoe upper by applying to the stock between two thicknesses of the upper material, immediately before the shoe is lasted, a coating or layer of pasty or plastic material known commercially as "box toe gum". Usually also a suitably shaped piece of absorbent sheet material, called the "box", is applied to the coated surface. When the shoe is lasted the several layers of the upper material are drawn into intimate contact as the toe of the shoe is conformed to the shape of the last and the gum hardens as it sets or dries and thus forms with the upper materials and box a stiffened or box toe. Heretofore the gum has been applied by means of a hand brush or dauber while the work was supported on a table, and in practice the gum was imperfectly spread and the quantity used on different shoes was not the same, although an excessive amount was commonly applied. This caused imperfect work as well as a waste of gum, and frequently the excessive and imperfectly spread gum was forced out at the edges of the shoe during the lasting operation and soiled the work and the machine. Also the faces of the shoe uppers were frequently smeared with gum from the table on which the work was supported while the gum was being applied. The machine herein shown as embodying my invention is constructed and arranged to apply and spread the gum upon the work in uniform quantities and without any liability of gum being smeared on the face of the work.

An important feature of the present invention consists in a machine comprising means for holding box toe gum and means for presenting the gum in regulated quantities to the work or in position to be applied to the work. In the embodiment of the invention herein shown the gum presenter is actuated to present at each operation a uniform quantity of gum and preferably means is provided for varying the quantity of gum thus presented. In the illustrated form of the invention the gum presenter has an extended surface comprising the periphery of a rotatable brush and the presenter is actuated intermittently by turning it to bring into position for engagement with the work a loaded portion of a length equal to the length of the portion of work to be coated. The rotation of the presenter is then discontinued, and preferably the presenter is held stationary, while the gum is applied to the work. By this arrangement the whole quantity of gum presented for application to the work at each operation may be predetermined. As herein shown, the work is held in the hands of the operator and the surface to be coated is pressed against the gum-loaded portion of the presenter and drawn across said portion to wipe the gum on the work and to spread it evenly over the entire surface being treated. It is of course obvious that the work might be sustained by any convenient form of work-support and also that any desired relative movements might be imparted to the work and presenter for causing the gum to be properly applied. Means are preferably provided for varying the distance through which the presenter shall be moved at each operation and thereby increasing or diminishing according to the size of the surface to be coated the length of the loaded portion of the presenter which will be exposed.

A further feature of the invention consists in improved means for delivering the box toe gum from the holder to the presenter. The construction of delivering means herein shown includes a transfer ring wheel mounted to rotate in a chamber or pocket which communicates with the lower portion of the gum holder, said transferring wheel being arranged to deliver the gum to the periphery of the presenter. An adjustable gate is provided for controlling the quantity of gum delivered to the presenter. The presenter is preferably a brush, as has been suggested, which in the contemplated use of the machine in the box toe gumming operation has the advantage that it carries a considerable quantity of gum in the bristles which is given up as the work is drawn transversely across the brush. A roll or wheel may of course be used instead of a brush if desired and in the event that a roll is desired the presenter may be omitted from the illustrated embodiment of the invention as a separate element and the gum or adhesive may be taken directly from the transferring wheel by the work. When the machine is so used the wheel serves as a presenter and the walls of the chamber guard from engagement by the work the adhesive on the portion of the periphery of the wheel covered by them and the walls adjacent to the delivery opening form a guide for aiding the operator to present the work in such manner as to get the required quantity of adhesive in the desired location on the work. Preferably the operating means for the gum presenter and transferring wheel when both are employed is arranged to turn these members in opposite directions, whereby the presenter removes the gum from the transferring wheel by a wiping action. This wiping action by which the gum is taken from the transferring wheel and distributed over the periphery of the presenter may be increased by imparting to the presenter a greater surface speed than that of the transferring wheel. This is effected, as shown, by employing a presenter of larger diameter than that of the transferring wheel. The means for delivering the box toe gum from the gum holder to the presenter also preferably includes feeding means constructed and arranged to force the gum into the chamber or pocket and against the transferring wheel so that although the gum may be of such consistency that it does not flow readily it will be fed to the transferring wheel with certainty and a continuous supply delivered to the presenter.

Other features of the invention, including details of construction and combinations of parts, will be hereinafter described and pointed out in the claims.

Figure 1 is a side elevation of a machine embodying the invention in a preferred form. Fig. 2 is a front elevation of the upper portion of the machine, portions being broken away. Fig. 3 is a rear view of the upper portion of the machine. Fig. 4 is a sectional view of the gum presenter, illustrating the means by which it is secured to its shaft for convenient removal. Fig. 5 is a detail view showing in perspective a portion of the gum holder, the transferring wheel, and the feeder. Fig. 6 is a detail of parts hereinafter described.

The machine comprises a frame 1 formed to rest on a floor and having an overhanging arm to which is attached a bracket 2 for sustaining the gum holder. The gum holder is shown as a tank or reservoir 4 having a removable cover and provided with a chamber or pocket 6 depending from its lower side, as illustrated most clearly in Figs. 1 and 2. The chamber or pocket has a slot in its bottom or floor and a gum transferring wheel 8 is arranged in the chamber or pocket, the wheel being of such a diameter as nearly to fill the chamber or pocket and extend upwardly into the tank 4 and downwardly through the slot in the floor of the chamber. The transferring wheel is mounted on a shaft 9 which turns in bearings formed in the bracket 2 and in the walls of the chamber or pocket 6, and in the operation of the machine, as hereinafter explained, the transferring wheel is turned for carrying gum from the tank or the chamber downwardly toward and on the periphery of a gum presenter 10, which is herein shown as a circular brush mounted to turn upon a stud 12 which projects forwardly from the frame of the machine, as shown most clearly in Fig. 1. The gum presenter is arranged to be rotated and to this end the stud 12 supports a sleeve 14, the outer end of which is provided with a shoulder 16 formed to engage in a correspondingly-shaped notch 18 in the rear end of the hub of the presenter. The presenter is removably held in position upon the stud by a latch 21 pivoted eccentrically on the presenter and adapted to engage in an annular groove in the outer end of the stud 12, said latch being held in the position to which it may be adjusted by frictional contact with the face of the presenter. The sleeve 14 has formed upon it or secured to it a pinion 20 which is connected by means of an intermediate gear 22 with a pinion 24 secured on the shaft 9. The shaft 9 carries on its rear end a ratchet wheel 26. A pawl carrier 30 is loosely supported upon the shaft 9 and sustains a pawl 32 which is acted upon by a spring 34 to hold it normally in engagement with the ratchet wheel 26. The pawl carrier is connected by a link 36 with a lever 38, which is pivoted at 40 to the machine frame and is in turn connected by a link 42 with an arm 44 of a manually controlled lever 45 fulcrumed on the machine frame and shown as arranged to be actuated by foot power. By moving the lower end of the foot lever downwardly and backwardly the pawl carrier will be drawn downwardly to cause rotation of the ratchet wheel 26 in the direction of the arrow thereon in Fig. 3, and this will cause rotation of the transferring wheel 8 and the gum presenter 10 in the direction indicated by the arrows on these parts in Fig. 2. Preferably the link 42 is not positively connected to the arm 44 of the foot lever but extends loosely through an opening in said lever, as shown in Fig. 1, and is surrounded between said lever and a stop nut 46 by a spring 48 through which the power is yieldingly transmitted for actuating the transferring wheel and presenter, as above described. As herein shown, a spring 50 encircles the shaft 9, having one end fixed in the bracket 2 and the other end secured to the pawl carrier 30. The spring is arranged to be compressed when the pawl carrier is moved downwardly for advancing the transferring wheel and gum presenter and by its expansion to lift the pawl carrier when pressure is removed from the foot lever, the pawl, of course, moving freely over the ratchet during this upward movement of the carrier. The several parts are constructed and arranged to present a clear space upon either side of the lower portion of the gum presenter, as shown in Fig. 1, whereby the work may be positioned with relation to the presenter as therein shown and wiped transversely across the lower face of the presenter, or longitudinally of its axis, to take off the gum and spread it over the surface to be coated.

The commercial box toe gum is of such consistency that it does not readily flow by gravity and I have, therefore, provided means for feeding the gum from the tank into the chamber or pocket 6 and pressing it against the transferring wheel. In the form illustrated the feeding means consists of a frame secured to the upper end of a vertical shaft 52, said frame comprising outwardly and downwardly extending arms 54 and wings 56 joining the lower ends of the arms and extending radially with relation to a collar 58. The collar 58 surrounds a sleeve 60 which is secured to or formed integral with the bottom of the tank 4 and constitutes a bearing for the vertical shaft 52. The side arms 54 are preferably arranged to travel in close proximity to the side walls of the tank to enable them to scrape the gum from the walls and facilitate its movement toward the bottom of the tank. The side arms also serve to stir the gum and keep it of uniform consistency. The feeder is sustained at such an elevation that the lower edges of the wings 56 are positioned close to the bottom of the tank. The wings are inclined in the direction of their width forwardly and upwardly so that as they pass over the chamber or pocket 6 they tend to feed or press the gum into the chamber and keep the chamber filled. As heretofore stated, the transferring wheel 8 projects upwardly into the tank a slight distance, as shown in Figs. 2 and 5, and the wings 56 are notched or cut away, as shown at 62, to enable them to pass over the transferring wheel. The notches 62 are of such width that the side walls thereof will just clear the sides of the transferring wheel as the wings pass over the wheel.

When the machine is used for applying other material or adhesive than the described gum the described stirring means or any other suitable means may be employed to keep the adhesive properly mixed or of the desired consistency or condition to be delivered and applied.

The opening in the bottom or floor of the chamber or pocket 6 is of a width but slightly in excess of the width of the transferring wheel 8 so that the side walls of the opening constitute means for scraping the gum from that part of the side portions of the transferring wheel which projects through the opening, thus preventing an accumulation or hardening of gum on the sides of the wheel. The rear wall of the said opening may, if desired, be arranged as shown in close proximity to the periphery of the transferring wheel, whereby it will act as a scraper to prevent the hardening or caking of gum on the periphery of the wheel. The front wall of the opening is spaced from the periphery of the transferring wheel a distance to permit said periphery to carry out of the chamber or pocket 6 a considerable quantity of gum and the amount of gum which in practice will be carried is regulated by an adjustable gate 70, which may also be employed for closing the opening entirely when the machine is not in use. It will be noted by reference to Fig. 2 that the gate is arranged in close proximity to the periphery of the presenter and constitutes a means for adjustably regulating the amount of gum normally carried on the periphery of the presenter. It may sometimes occur when the machine is allowed to stand idle for some time with the gate 70 open that gum will flow through the opening in the bottom of the chamber or pocket 6 and collect in a lump or mass on the adjacent portion of the periphery of the presenter. In such an event the presenter would be likely to deliver an excessive quantity of gum in one place when the machine was started. To avoid such a difficulty the machine shown is provided with means, shown as a toothed member 71, adapted to spread or distribute over the periphery of the presenter any abnormal accumulation of gum which may find its way on the presenter. The toothed distributer spreads the accumulated gum over an extended area of the presenter without causing the gum to load upon it as might occur with a smooth edged scraper such as is sometimes used for distributing cement and other material.

If it is desired to take the gum or adhesive directly from the transferring wheel 8, as has been suggested, the stud 12 with the brush 10 and the driving parts, also carried by the stud, are readily removed from the machine by loosening the set screw shown in Fig. 1 which holds said stud in the machine head. The work will then be presented as will be plain from Fig. 2 directly against the projecting portion of the transferrer which extends from between the walls of the chamber 6. The lower wall of this chamber having the flanged plate 90 will then serve as a rest against which the work will be positioned and the slide 70 will regulate the length of the delivery opening. The member 71 may be removed or may remain and serve as a gage.

In the use of the machine the operator actuates the several parts, including the feeder, the transferring wheel, and the gum presenter, by means of the foot lever 45. Each advance movement of the gum presenter takes place in the direction of the arrow thereon in Fig. 3 and brings to the lower side of the presenter a portion thereof loaded with gum, said portion in practice being of a length approximately the same as the length of the portion of work to be coated with the gum. The operator then presses the work upwardly against the loaded portion of the periphery of the presenter and draws the work across the presenter to spread the gum uniformly over the surface being treated. The mechanism is then actuated to bring another loaded portion of the presenter into position for the gum to be applied to another piece of work. The gum can thus be very rapidly and accurately applied to the work for the presenter may be advanced by means of the foot lever while the operator is picking up the piece of work to be treated, and the presenter will then be at rest when the work is pressed against it so that the operator may accurately position the work with relation to the gum-loaded surface of the presenter and so insure the application of the gum to precisely the desired portion of the work. For the purpose of varying according to the length of the piece of work the extent of the advance movement of the presenter, and therefore the length of the loaded portion of the presenter which will be exposed at each operation, means is provided for limiting the backward stroke of the pawl carrier. As herein shown, this limiting means comprises an adjustable stop carrier 75 mounted on a stud 78 projecting from the frame of the machine, said carrier being provided with a plurality of stop faces 76 of different lengths adapted to be engaged by the upper face of the lever 38 before described. By adjusting the stop carrier to bring one or another of said stops into position to be engaged by the lever in the upward stroke of the pawl carrier the extent of the advance movement of the gum presenter may be accurately regulated. The stop carrier is mounted to turn freely and to slide longitudinally on its pivot stud 78 and said pivot stud is provided with a stop 80 adapted to engage in one or another of a plurality of notches 82 in the outer face of the stop carrier. A spring 84 surrounds the pivot stud, as shown in Fig. 3, and normally holds the stop carrier pressed outwardly with the stop 80 located in one or another of the notches 82. In order to prevent the possibility of the gum presenter turning backwardly from any cause, as, for instance, if the work is wiped along the surface of the presenter in the direction of the length of its periphery instead of transversely across it for spreading gum upon the work, means may be provided for locking the ratchet wheel 26 against reverse movement. A convenient form of means herein shown for this purpose comprises a locking pawl 86 having a weighted arm which holds the pawl normally out of engagement with the ratchet wheel, and a stud 88 is mounted on the pawl carrier 30 in position to engage the locking pawl and force it into contact with the ratchet at the time when the downward stroke of the pawl carrier for advancing the presenter has been completed. The spring 48, through which the advance movement of the parts is yieldingly effected, enables the movement of the foot lever to be completed without danger of causing the locking pawl to strip teeth from the ratchet.

It is important to prevent the gum from hardening or setting on the presenter during times when the machine is idle for a considerable period, as, for example, during the night. It is the practice, therefore, to remove the presenter from its stud or axle 12 and place it in water when it is not in use. A convenient receptacle for this purpose comprises a suitably shaped pan 87 removably secured upon a bracket 89 on the machine frame, the pan being located so that it may receive any drippings of gum which may fall from the transferring wheel or other parts when the presenter is removed. It is also important to prevent the gum from hardening or setting upon the exposed face of the transferring wheel and in the spaces between the wheel and the bottom of the chamber or pocket when the machine is idle, and to this end the present machine is formed with a flange 90 on the lower portion of the walls of the chamber 6, said flange being provided with notches 92. A basin 94 having on its inner side walls lugs 96 is adapted to receive the lower end of the chamber 6, the lugs being passed upwardly through the notches 92 and resting upon the flange 90 when the basin is shifted slightly in the direction of its length. The basin may contain water or other liquid by which the gum in the lower end of the chamber and on the adjacent parts may be kept from drying.

While the invention is herein shown and described as embodied in a machine particularly adapted for use in applying box toe gum to shoes, it is obvious that the invention is not limited to the construction and uses described, but may be embodied in other forms of machines and employed for many other purposes. Preferably the machine is equipped as herein illustrated with means for manually actuating the presenter to bring the gum carried by it into position to be applied to the work and is then left at rest while the gum is taken off by the work; but if desired automatically operated means may be employed for actuating the presenter.

Having fully described my invention, I claim as new and desire to secure by Letters Patent:—

1. In a machine of the class described, the combination with means for holding gum, of a presenter, means for actuating the presenter to deliver gum once for each piece of work to be coated, and means for regulating the whole quantity of gum delivered by the presenter at each operation into position to be applied to the work.

2. In a machine of the class described, the combination with means for holding gum, of a presenter for delivering gum intermittently in regulated quantities into position to be applied to the work, means for varying the quantity of gum carried by the presenter, and means for actuating the presenter.

3. In a machine of the class described, the combination with means for holding gum, of a presenter, means for actuating the presenter to deliver gum in regulated quantities in position to be applied to the work, and adjustable means for varying the operation of the presenter to control the amount of gum delivered by it at each operation of the machine.

4. In a machine of the class described, the combination with means for holding gum, of a presenter arranged to receive gum from the holder and carry it into position to be applied to the work, and means for actuating the presenter to deliver the gum intermittently.

5. In a machine of the class described, the combination with means for holding gum, of a gum presenter arranged to receive gum from the holder, and means for advancing the presenter step by step to bring loaded portions thereof successively into position for the gum to be applied to the work.

6. In a machine of the class described, the combination with means for holding gum, of a rotatable brush arranged to receive gum from the holder, and means for turning the brush intermittently through measured distances to present loaded portions of substantially the length of the pieces of work to be coated.

7. In a machine of the class described, the combination with means for holding gum, of a gum presenter, means for transferring the gum from the holding means to the presenter, means for actuating the presenter to deliver the gum in position to be applied to the work, and means for adjustably determining the whole quantity of gum delivered by the presenter at each operation.

8. In a machine of the class described, the combination with means for holding gum, of a gum presenter, means for transferring the gum from the holding means to the presenter, means for spreading the gum on the periphery of the presenter means for actuating the presenter to deliver the gum in position to be applied to the work, and means for regulating the whole quantity of gum delivered by the presenter at each operation.

9. In a machine of the class described, a gum holder, a gum presenter, and mechanism for advancing the presenter to deliver gum in position to be taken from it by the work, said machine having provision for securing the presenter against forward and backward movement while gum is being removed therefrom.

10. In a machine of the class described, the combination with means for holding gum, of a gum presenter, a rotatable transferring wheel for carrying gum from the holder to the presenter, means for actuating the transferring wheel, and means for actuating the presenter in the direction and at a greater surface speed than that of the transferring wheel whereby the gum is wiped from the transferring wheel and distributed over the periphery of the presenter.

11. In a machine of the class described, the combination with means for holding gum, of a gum presenter, means for adjustably regulating the whole quantity of gum delivered by the presenter at each operation, a transferrer, means to actuate the transferrer for delivering gum to the presenter, and means for forcing the gum against the transferrer.

12. In a machine of the class described, the combination with means for holding gum, of a transferring wheel, means for turning the transferring wheel, and means operated when the transferring wheel is operated for forcing the gum against the periphery of the wheel.

13. A machine of the class described, comprising a gum holder, a gum presenter, means for intermittently advancing the gum presenter to bring loaded portions thereof into position for the gum to be taken off by the work, said presenter being constructed and arranged to permit the work to be wiped transversely across its face while the presenter is at rest.

14. In a machine of the class described, the combination with means for holding gum, said means comprising a reservoir and a relatively small chamber communicating therewith, of a transferring wheel mounted in said chamber, means for forcing the gum into the chamber, and means for actuating the transferring wheel to deliver gum.

15. In a machine of the class described, the combination with means for holding gum, of a gum presenter, a transferrer for delivering gum from the holder to the presenter, a rotary feeder mounted in the holder and provided with members extending forwardly and downwardly with relation to the direction of its rotation, and means for actuating the feeder to stir the gum and press it against the transferrer.

16. In a machine of the class described, the combination with means for holding gum, of a sleeve secured to the floor of the holder, a shaft rotatable in said sleeve, and a stirrer suspended from the upper portion of the shaft to be rotated thereby, said stirrer having a bearing on the lower portion of said sleeve.

17. In a machine of the class described, the combination with means for holding gum, of a presenter, a manually controlled lever, and operative connections between said lever and presenter whereby the presenter may be actuated at the will of the operator to deliver gum into position to be applied to the work.

18. In a machine of the class described, the combination with means for holding gum, of a presenter, a manually controlled lever, operative connections between said lever and presenter, and adjusting means for determining the extent of movement imparted to the presenter whereby the presenter may be actuated at the will of the operator for delivering measured quantities of gum into position to be applied to the work.

19. In a machine of the class described, the combination with means for holding gum, of a presenter, actuating mechanism for advancing the presenter through measured distances to deliver gum into position to be applied to the work, and means for locking the presenter against reverse movement.

20. A machine of the class described, comprising means for holding gum, a rotatable presenter, and actuating mechanism for advancing the presenter to deliver gum into position to be taken off by the work, said machine having provision for holding the presenter against rotary movement in either direction while gum is being removed therefrom.

21. In a machine of the class described, the combination with means for holding gum, said means being provided with a delivery opening, and gum delivering means arranged to be actuated for carrying gum through said opening, of a covering member independent of the gum holding means, and means for supporting said member in position to seal the delivery opening whereby hardening of the gum on said delivering means and the adjacent parts is avoided.

22. In a machine of the class described, the combination with a gum holder having a delivery opening and a transferring wheel for delivering gum through said opening, of a water pan and interlocking means carried by the gum holder and water pan for sustaining the latter in position to protect the gum on the exposed portion of said wheel and in the opening from drying.

23. In a machine of the class described, a gum holder and a rotary gum presenter arranged to permit work to be presented thereto by a movement longitudinally of the axis of rotation of the presenter, combined with means for rotating the presenter to bring different loaded portions thereof successively into position to receive the work, and means for adjustably regulating the whole quantity of gum brought by the presenter at each operation into position to be taken by the work.

24. In a machine of the class described, the combination with a gum holder and a rotary gum presenter arranged below the holder in position to receive gum therefrom, of a toothed distributer arranged in operative relation to the gum presenter.

25. In a machine of the class described, the combination with means for holding gum, of a presenter constructed and arranged to bring gum into position to be applied to the work, and means for actuating the presenter through a predetermined distance and then arresting the movement of the presenter, whereby a regulated quantity of gum is presented to the work at each operation of the machine.

26. In a machine of the class described, the combination with means for holding gum, of a rotary presenter constructed and arranged to permit the gum to be removed therefrom by a movement of the work relatively to the presenter, means for controlling the thickness of the layer of gum taken up by the presenter, and means for actuating the presenter through a predetermined distance and then discontinuing the movement of the presenter while gum is being removed by the work.

27. In a machine of the class described, the combination with means for holding gum, of a presenter arranged to receive gum from the holder, means for advancing the presenter, and means for limiting automatically the extent of each advance in order to predetermine the extent of loaded area of the presenter made available for the work at each operation of the machine.

28. In a machine for applying gum to work, the combination with means for holding gum, of a rotatable member for receiving and presenting the gum and actuating means for causing said member to take up gum and then to remain stationary while the gum is being applied to the work.

29. In a machine for applying gum to work, the combination with means for holding gum, of a rotatable presenter constructed and arranged to receive and deliver the gum, and means for actuating the presenter having provision for holding the presenter against rotary movement while the gum is being applied to the work.

30. In a machine for applying gum to shoes, the combination with means for holding gum, of a rotatable member to receive gum and present it to a shoe, and means for actuating said member to take up gum and carry it into position to be applied to the shoe, said machine having provision for discontinuing the movement of the presenter while gum is being taken from it by the shoe.

31. In a machine of the class described, the combination with means for holding gum, a gum presenter arranged to receive gum from the holder, means for moving the presenter intermittently to bring a loaded portion thereof into position for the gum to be applied to the work, and means for advancing the gum from the holder toward the presenter simultaneously with the movement of the presenter.

32. In a machine for delivering adhesive, the tank 4, the roll 8 turning in the adhesive and projecting from the tank, means to actuate the roll, the members 54, 56 in the tank to maintain the adhesive adjacent to the roll in condition to be delivered by the roll, the chamber 6 having walls covering a portion of the periphery of the roll in front and back thereof, and the adjustable member 70 for varying the size of the delivery opening.

33. A machine of the class described having, in combination, a tank to contain adhesive, a roll running in the adhesive and projecting from the tank to deliver adhesive, means for maintaining the adhesive in a condition for delivery by the roll, and roll covering means extending from the tank about the periphery of the roll from opposite directions and terminating short of the delivery point to protect the adhesive, said covering means including an adjustable element to vary the extent of the uncovered portion of the roll.

34. A machine of the class described having, in combination, a tank to contain adhesive, a roll running in the adhesive and projecting from the tank to deliver adhesive, means for maintaining the adhesive in condition for delivery by the roll, and roll covering means extending from the tank about the periphery of the roll from opposite directions and terminating short of the delivery point to protect the adhesive on the periphery except at the delivery point, and means for driving the delivery roll.

35. A machine of the class described having, in combination, a tank to contain adhesive, a roll running in the adhesive and projecting from the tank to deliver adhesive, means located within the tank to maintain the adhesive in condition to be transferred by the roll, and means extending from the tank to cover the projecting portion of the periphery of the roll at each side of the delivery point.

36. A machine of the class described having, in combination, a tank to contain adhesive, a narrow transferring wheel or roll running in the tank to take up adhesive and projecting from the tank to deliver the adhesive therefrom, means extending from the tank to cover a portion of the periphery of the roll at each side of the delivery point, and arranged to leave a comparatively short portion of the periphery therebetween exposed for delivery of adhesive, and means for turning the roll.

In testimony whereof I have signed my name to this specification in the presence of two subscribing witnesses.

ORRELL ASHTON.

Witnesses:
ARTHUR L. RUSSELL,
WELLS L. CHURCH.